United States Patent
Versin et al.

(10) Patent No.: US 10,766,474 B2
(45) Date of Patent: Sep. 8, 2020

(54) VALIDATING OPERATION OF A SECONDARY BRAKING SYSTEM OF A VEHICLE

(71) Applicant: VEONEER-NISSIN BRAKE SYSTEMS JAPAN CO., LTD., Yokohama-shi, Kanagawa (JP)

(72) Inventors: Alexandru Versin, Rochester Hills, MI (US); Arnie Spieker, Commerce Township, MI (US)

(73) Assignee: Veoneer-Nissin Brake Systems Japan Co., Ltd., Kanagawa (JP)

( * ) Notice: Subject to any disclaimer, the term of this patent is extended or adjusted under 35 U.S.C. 154(b) by 284 days.

(21) Appl. No.: 15/941,739

(22) Filed: Mar. 30, 2018

(65) Prior Publication Data

US 2019/0299961 A1 Oct. 3, 2019

(51) Int. Cl.
| | |
|---|---|
| *B60T 17/22* | (2006.01) |
| *B60T 8/172* | (2006.01) |
| *B60T 13/66* | (2006.01) |
| *B60T 13/20* | (2006.01) |

(52) U.S. Cl.
CPC ............ *B60T 17/221* (2013.01); *B60T 8/172* (2013.01); *B60T 13/20* (2013.01); *B60T 13/662* (2013.01); *B60T 2270/311* (2013.01); *B60T 2270/402* (2013.01); *B60T 2270/406* (2013.01)

(58) Field of Classification Search
None
See application file for complete search history.

(56) References Cited

U.S. PATENT DOCUMENTS

| | | | |
|---|---|---|---|
| 5,979,997 | A | 11/1999 | Ohkubo et al. |
| 6,007,164 | A | 12/1999 | Sakai et al. |
| 6,161,904 | A | 12/2000 | Schmidt et al. |
| 6,206,489 | B1 | 3/2001 | Schmidt et al. |
| 6,231,133 | B1 | 5/2001 | Tsukamoto |
| 6,430,943 | B2 | 8/2002 | Pfister et al. |

(Continued)

FOREIGN PATENT DOCUMENTS

| | | |
|---|---|---|
| DE | 102005004774 A1 | 9/2005 |
| EP | 1442227 A1 | 8/2004 |

(Continued)

OTHER PUBLICATIONS

International Search Report and Written Opinion issued in correlated Application No. PCT/IB2019/052556, dated Jul. 30, 2019.

*Primary Examiner* — Richard M Camby
(74) *Attorney, Agent, or Firm* — Carrier Blackman & Associates, P.C.; Joseph P. Carrier; William D. Blackman

(57) ABSTRACT

A method and a system are disclosed for validating operation of a secondary braking system (SBS) of a vehicle having a plurality of brakes. The method may involve generating a predetermined braking pressure for at least one brake of the plurality of brakes and calculating, via an electronic control unit (ECU), an estimate of a pump output pressure based upon a counter electromagnetic force generated by a motor within the SBS. The method may further involve comparing an expected pump output pressure to the estimate, wherein the expected pump output pressure corresponds to the predetermined braking pressure and determining whether the SBS is operating properly based upon the comparison.

20 Claims, 4 Drawing Sheets

(56) References Cited

U.S. PATENT DOCUMENTS

| | | |
|---|---|---|
| 6,450,591 B1 | 9/2002 | Kawahata et al. |
| 7,395,907 B2 | 7/2008 | de Kock et al. |
| 2002/0050739 A1 | 5/2002 | Koepff et al. |
| 2002/0166369 A1 | 11/2002 | Harris et al. |
| 2003/0038538 A1 | 2/2003 | Niepelt et al. |
| 2004/0041467 A1 | 3/2004 | Giers et al. |
| 2007/0035179 A1 | 2/2007 | Kling et al. |
| 2008/0106142 A1 | 5/2008 | Nishino et al. |
| 2008/0234909 A1 | 9/2008 | Iwasaki et al. |
| 2010/0176653 A1 | 7/2010 | Arakawa |
| 2011/0241419 A1 | 10/2011 | Ohkubo et al. |
| 2012/0235469 A1 | 9/2012 | Miyazaki et al. |
| 2012/0256477 A1 | 10/2012 | Miyazaki et al. |
| 2012/0283926 A1 | 11/2012 | Ito |
| 2013/0218407 A1 | 8/2013 | Jungbecker et al. |
| 2013/0241275 A1 | 9/2013 | Miyazaki et al. |
| 2014/0008965 A1 | 1/2014 | Ito et al. |
| 2015/0175144 A1 | 6/2015 | Watanabe |
| 2015/0367828 A1 | 12/2015 | Oosawa et al. |
| 2018/0229707 A1* | 8/2018 | Son ................. B60T 13/686 |

FOREIGN PATENT DOCUMENTS

| | | |
|---|---|---|
| GB | 2403520 A | 1/2005 |
| WO | WO-03040586 A1 | 5/2003 |

* cited by examiner

VALIDATING OPERATION OF A SECONDARY BRAKING SYSTEM OF A VEHICLE

FIELD

The present disclosure relates to braking system for motor vehicles, and more particularly to a system and method for validating operation of a secondary braking system of a vehicle based upon a counter electromagnetic force of a motor.

BACKGROUND

The statements in this section merely provide background information related to the present disclosure and may not constitute prior art.

Braking systems used on motor vehicles such as passenger cars and trucks often employ a Primary Brake System ("PBS") and a Secondary Brake System ("SBS"), which are hydraulically connected in series. The PBS provides the main means for generating brake pressure to the brake calipers associated with the four wheels of the vehicle. The PBS does this while constantly monitoring the hydraulic fluid that it applies and the pressure it generates, internal to the PBS itself.

The SBS often forms a portion of an Electronic Stability Control System ("ESC"). The ESC system is able to independently control hydraulic pressure applied to the brake calipers of at least two wheels of the vehicle, often the front right and front left brakes calipers, in response to detected braking conditions (e.g., emergency evasive braking maneuver), with a goal maintaining control of the vehicle. The SBS also forms a backup braking system which is able to hydraulically control the brake fluid applied to at least two brakes of the vehicle in the event that a failure occurs in the PBS.

There is continued growing interest in being able to check and verify operation of the SBS to assist in ensuring integrity of the overall system, however, quick and easy systems and/or methods for verifying SBS performance are lacking.

SUMMARY

In one aspect, the present disclosure relates to a method for validating operation of a secondary braking system (SBS) of a vehicle having a plurality of brakes. The method may comprise generating a predetermined braking pressure for at least one brake of the plurality of brakes. The method may also involve calculating, via an electronic control unit (ECU), an estimate of a pump output pressure based upon a counter electromagnetic force generated by a motor within the SBS and comparing an expected pump output pressure to the estimate. The expected pump output pressure corresponds to the predetermined braking pressure. Based upon the comparison, a determination is made of whether the SBS is operating properly.

In another aspect, the present disclosure relates to a method for validating operation of a secondary braking system (SBS) of a vehicle having a plurality of brakes. The method may comprise generating a predetermined braking pressure for at least one brake of the plurality of brakes and calculating, via an electronic control unit (ECU) of the SBS, an estimate of a pump output pressure based upon a counter electromagnetic force generated by a motor within the SBS. The method may also involve retrieving an expected pump output pressure corresponding to the predetermined braking pressure and comparing the expected pump output pressure to the estimate. The expected pump output pressure corresponds to the predetermined braking pressure. The method may use the comparison to determine whether the SBS is operating properly.

In still another aspect, the present disclosure relates to a system for validating operation of a secondary braking system (SBS) of a vehicle having a plurality of brakes. The system may include a primary braking system (PBS), the SBS, and an electronic subsystem. The SBS is configured to be controlled to generate a predetermined braking pressure in the SBS for at least one of the brakes. The electronic subsystem may be configured to calculate an estimate of a pump output pressure based upon a counter electromagnetic force generated by a motor within the SBS and to compare an expected pump output pressure to the estimate. The expected pump output pressure corresponds to the predetermined braking pressure. The electronic subsystem may also be configured to determine whether the SBS is operating properly based upon the comparison.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
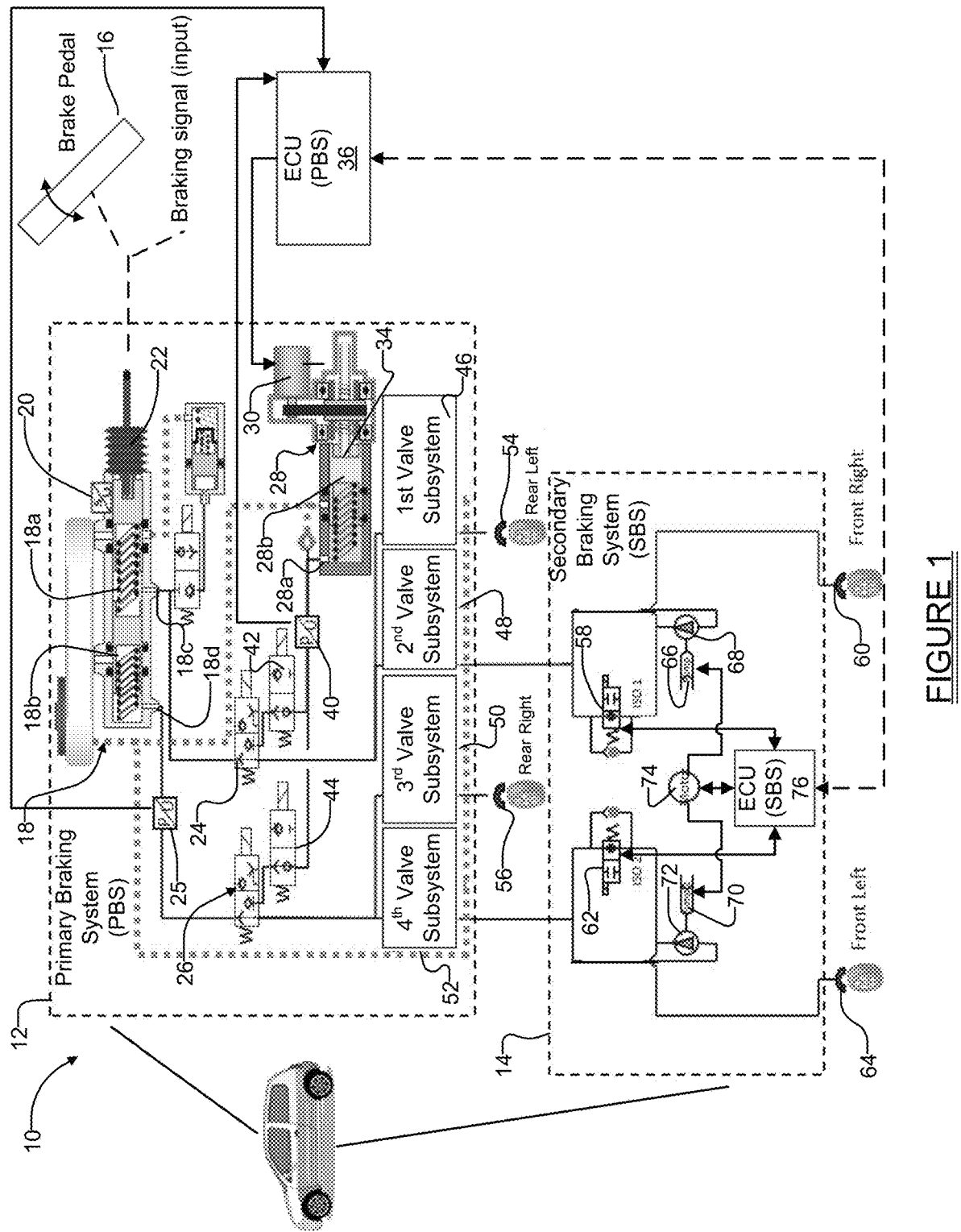
FIG. 1 shows a high level block diagram of one embodiment of a validation system of the present disclosure in which a Secondary Braking System (SBS) is hydraulically connected in series with a Primary Braking System (PBS)

The following description is merely exemplary in nature and is not intended to limit the present disclosure, application, or uses. It should be understood that throughout the drawings, corresponding reference numerals indicate like or corresponding parts and features.

The growing interest in autonomous vehicles has added the requirement of a validation mechanism to check that the SBS is functioning normally, even while the PBS is functioning normally, to ensure the redundancy of the overall braking system. Ideally, this validation mechanism should be implemented with minimal additional component parts being introduced into the vehicle's braking system and without unduly complicating operation of the PBS or the SBS. Moreover, the validation mechanism should operate transparently to the user so that a validation check can be automatically performed by the braking system.

FIG. 1 illustrates a system 10 in accordance with one embodiment of the present disclosure. The system 10 includes a Primary Braking System ("PBS") 12 and a Secondary Braking System 14 ("SBS") which are connected hydraulically in series.

The PBS 12 may include a brake pedal 16 or other component which provides an input braking signal to a master cylinder 18. The master cylinder includes a stroke sensor 20 for sensing a stroke of the brake pedal 16 (assuming a brake pedal is incorporated). A pedal feel simulator valve ("PFSV") 22 may be in communication with an output port 18c of a primary circuit portion 18a of the master cylinder 18 and also with a primary circuit first master cut valve ("MCV") 24. A secondary circuit portion 18b of the master cylinder 18 may be in communication with a first pressure sensor 25 via an output port 18d, which is in turn in communication with a primary circuit second MCV 26.

The PBS 12 further may include a slave cylinder 28 having a cylinder portion 28b with an output port 28a. An electric motor 30 operably associated with the slave cylinder 28 may be used to drive a slave cylinder piston 34 residing within the cylinder portion 28b linearly in response to commands from an electronic control unit (ECU) 36 of the PBS 12. The slave cylinder 28 is used to help generate fluid pressure in the PBS 12 and the SBS 14. A piston travel sensor 32 may monitor the real time travel of the slave cylinder piston 34 and provide this information to the ECU 36.

The output port 28a of the slave cylinder 28 may be in communication with a pressure sensor 40, which in turn may be in communication with a first apply valve (APV) 42 and a second APV 44. The first and second APVs 42 and 44 may be in communication with MCVs 24 and 26, respectively. In this manner, fluid pressure generated by the slave cylinder 28 can be used to help pressurize both the PBS 12 and the SBS 14.

The first MCV 24 may be in communication with first and second valve subsystems 46 and 48, respectively. The second MCV 26 may be in communication with third and fourth valve subsystems 50 and 52, respectively. First valve subsystem 46 in this example controls the flow of hydraulic fluid flow to the rear left brake caliper 54, while third valve subsystem 50 controls the hydraulic fluid flow to a rear right brake caliper 56. Second valve subsystem 48 communicates with a first isolation ("ISO") valve 58 of the SBS 14, which in this example helps to control the hydraulic flow to a front right brake caliper 60. The fourth valve subsystem 52 communicates with a second ISO valve 62 of the SBS 14, which in this example helps to control hydraulic fluid flow to a front left brake caliper 64.

In addition to the first and second ISO valves 58 and 62, the SBS 14 may also include a first pump 66 and a one-way valve 68, which enable communication of the first pump with the second valve subsystem 48 and also with the front right brake caliper 60. A second pump 70 and a one-way valve 72 may be included which communicate with the fourth valve subsystem 52 and also with the front left brake caliper 64. It is understood that the one-way valves 68, 72 may be integral with the corresponding pumps 66, 70 in some implementations. The SBS 14 may also include a motor 74 which is controlled by an electronic control unit (ECU) 76 to help raise the hydraulic fluid braking pressure in the SBS 14 when performing a validation check, as will be described in greater detail in the following paragraphs.

The isolation valves 58 and 62 may be used to disable excessive fluid communication from the wheel cylinders associated with the front right and front left brake calipers 60 and 64 back to the slave cylinder 28 and the master cylinder 18. The PBS 12 in this example is used to control the application of hydraulic braking fluid to all four brake calipers 54, 56, 60 and 64 during normal braking action. The SBS 14 can be used when a failure within the PBS 12 occurs. It is therefore important that proper functioning of the SBS 14 is verified, for example periodically as required or needed, to ensure the redundancy of the system 10. This is especially so if the system 10 is being used in an autonomous vehicle.

To implement the SBS validation feature that the system 10 provides, during initial testing and calibration of the system 10, a determination may be made of an expected output pressure of pump 66 and/or pump 070 with a predetermined braking pressure. For example, given a range of predetermined braking pressure, the motor 74 comprises a corresponding range of expected pump output pressures. Thus, each predetermined braking pressure includes a corresponding expected pump output pressure.

As described in greater detail herein, the counter electromagnetic force of the motor 74 can be used to estimate the pump output pressure of the pump 66 and/or the pump 70. The counter electromagnetic force represents an estimate of a load on the motor 74. The load on the motor 74 can be used to estimate the pump output pressure.

Figure 2:
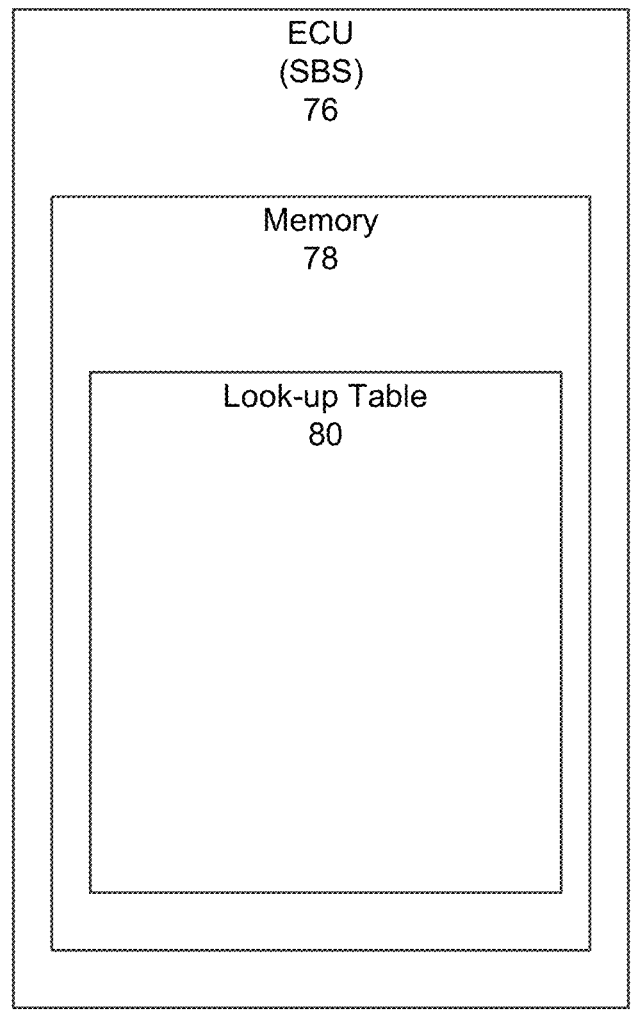
FIG. 2 is a block diagram illustrating an example electronic control unit.

As shown in FIG. 2, the SBS ECU 76 includes a memory 78, which includes a look-up table 80. The memory 78 may comprise any suitable non-volatile memory. The look-up table 80 stores the range of predetermined braking pressure and corresponding expected output pressures. The system 10 may initiate testing of the SBS 14 in suitable testing environments. For example, the system 10 may initiate testing of the SBS 14 when the vehicle is in park and in an operational state (e.g., the vehicle is on). Testing of the SBS 14 can serve to ensure that the SBS 14 is operating properly. In some examples, the SBS ECU 76 receives a signal to initiate the operation from the PBS ECU 34. In other examples, the SBS ECU 76 independently initiates the operation.

The look-up table 80 can also include a range of counter electromagnetic forces and corresponding estimated pump output pressures. Data representing the range of counter electromagnetic forces and the corresponding estimated pump output pressures may be stored in the look-up table 80 during initial testing and calibration of the system 10.

Figure 3:
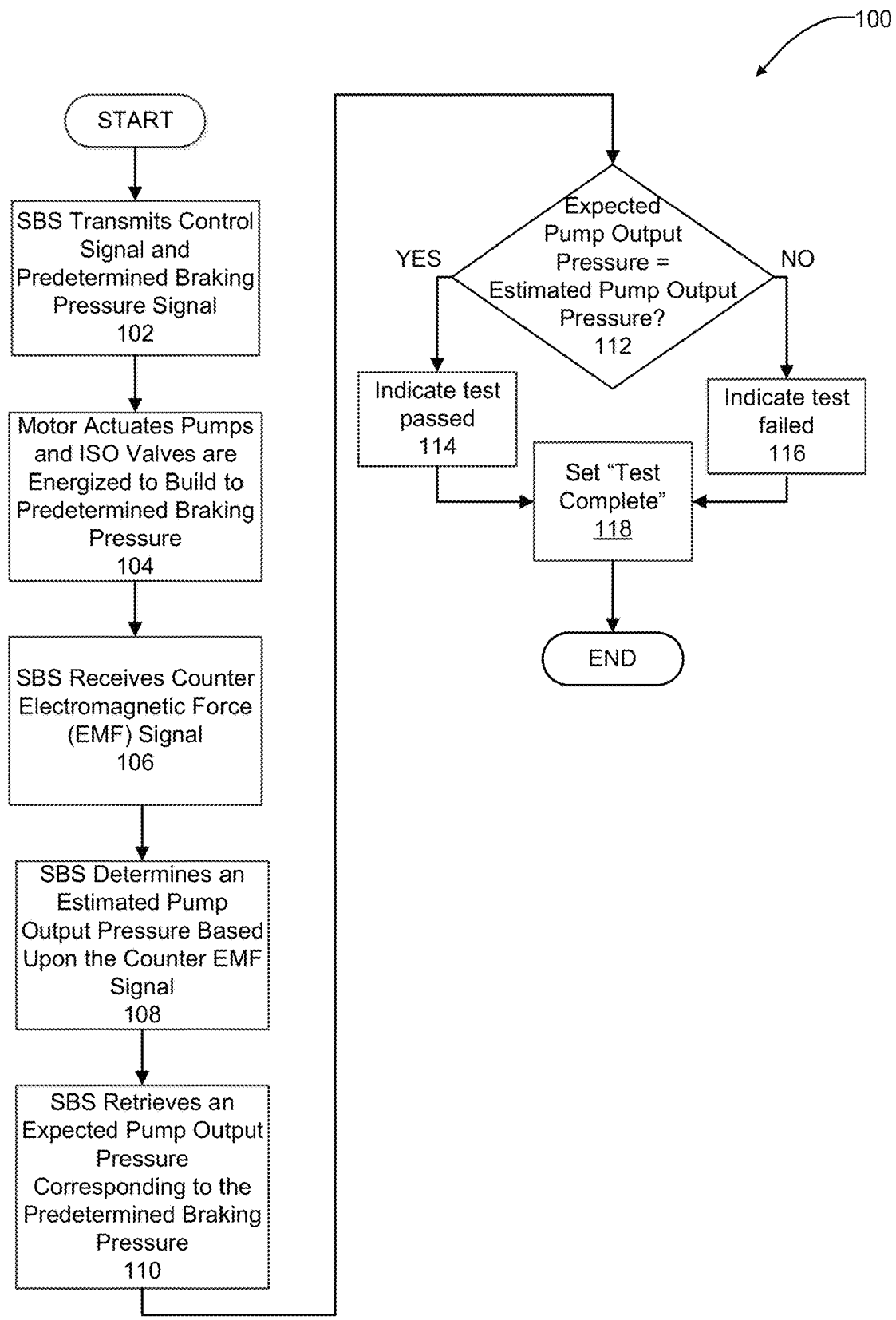
FIG. 3 is a high level flowchart illustrating a plurality of operations that may be performed during a SBS validation test.

Referring to FIG. 3, a flowchart illustrating an example method 100 for monitoring operation of the SBS 14. At operation 102, the SBS 14 transmits a control signal to the motor 74 and/or a predetermined braking pressure signal to the isolation valves 58, 62 to regulate the braking pressure. In some implementations, the SBS 14 receives a signal to initiate operation of the SBS 14 validation from the PBS 12. The motor 74 actuates the pump 66 and/or the pump 70 to build the braking pressure to the predetermined braking pressure at operation 104 and the isolation valves 58, 62 regulate the braking pressure according to the braking pressure signal. At operation 106, the SBS 14 receives a counter electromagnetic force signal from the motor 74 indicative of the counter electromagnetic force. For example, the counter force signal may be a voltage measurement from the motor 74 that is indicative of the counter electromagnetic force resulting from actuation of the pump 66 and/or the pump 70.

The SBS 14 determines an estimated pump output pressure based upon the counter electromagnetic force signal at operation 108. At operation 110, the SBS 14 retrieves an expected pump output pressure corresponding to the predetermined braking pressure from the look-up table 80. The SBS 14 compares the expected pump output pressure to the estimated pump output pressure to determine whether the SBS 14 is within a predetermined threshold at operation 112. For example, the SBS 14 calculates a difference between the expected pump output pressure and the estimated pump output pressure, and determines whether the difference is within the predetermined threshold.

The SBS 14 indicates that a test passed when the comparison indicates the estimated pump output pressure is within the predetermined threshold at operation 114 and indicates the test failed when the estimated pump output pressure is not within the predetermined threshold at operation 116. For example, the SBS 14 can determine whether the difference is within the predetermined threshold. At operation 118, the SBS 14 generates a "Test Complete" message.

Figure 4:
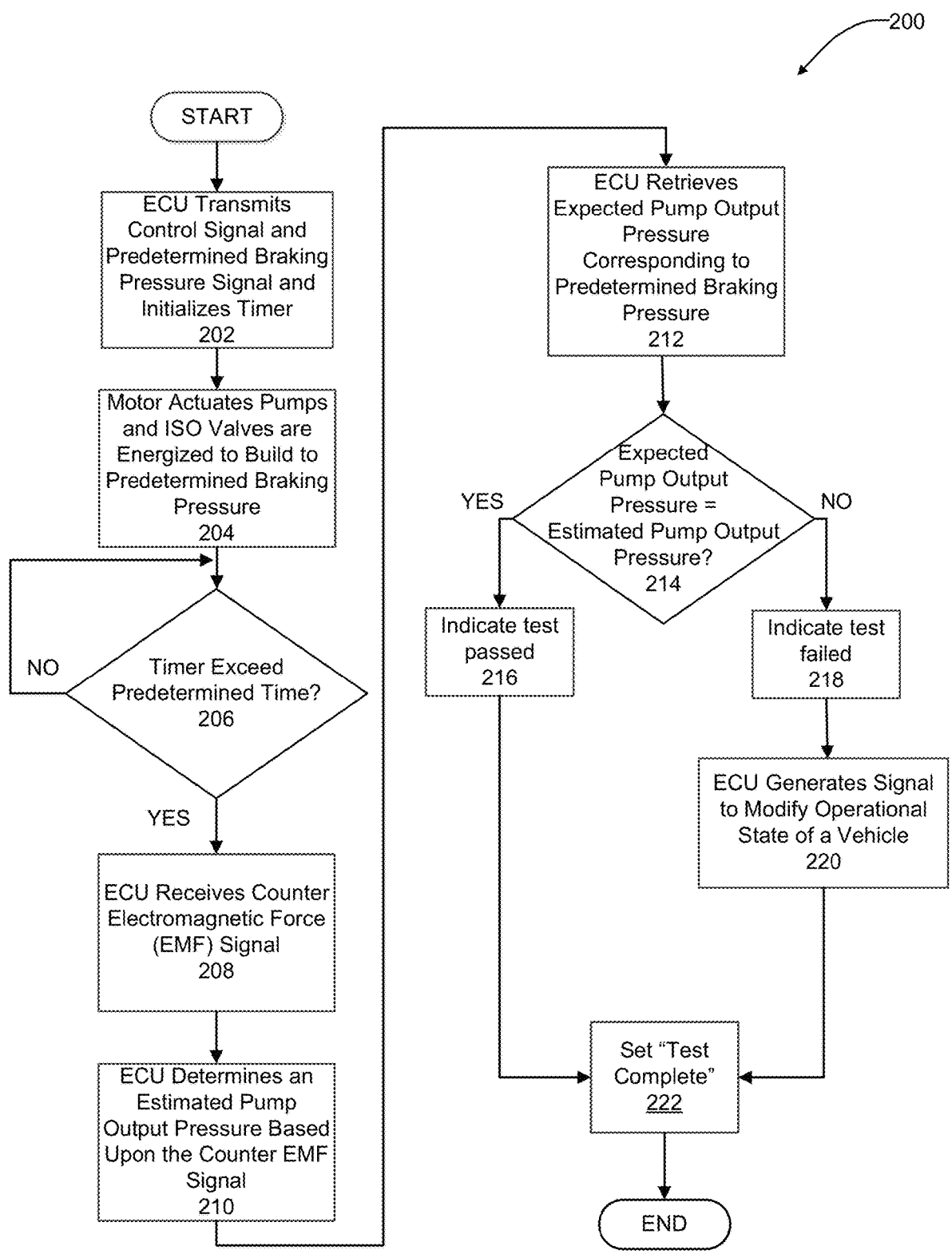
FIG. 4 is a more detailed flowchart illustrating a plurality of operations that the system of FIG. 1 may perform in validating operation of the SBS.

FIG. 4 illustrates a flowchart of an example method 200 for monitoring operation of the SBS 14. At operation 202, the SBS ECU 76 sends a control signal to the motor 74, sends a predetermined braking pressure signal to the isolation valves 58, 62, and initializes a timer. At operation 204, the motor 74 actuates the pump 66 and/or the pump 70 and the isolation valves 58, 62 are energized to cause the braking pressure to build the braking pressure to the predetermined braking pressure at operation 204. For example, the SBS ECU 76 transmits a signal to the motor 74 indicative of a predetermined braking pressure. The motor 74 actuates the pump 66 and/or pump 70 to build the braking pressure within the corresponding calipers 60 and/or 64 to the target braking pressure.

At operation 206, the SBS ECU 76 determines whether the timer has exceeded a predetermined time. If the timer has not exceeded the predetermined time, the method 200 returns to operation 206. If the timer has exceeded the predetermined time, the SBS ECU 76 receives a counter electromagnetic force signal from the motor 74 indicative of the counter electromagnetic force at operation 208. For example, the SBS ECU 76 may measure the counter electromagnetic force of the motor 74.

At operation 210, the SBS ECU 76 determines an estimated pump output pressure based upon the counter electromagnetic force signal. For example, the SBS ECU 76 may access the look-up table 80 to retrieve an estimated pump output pressure based on the received counter electromagnetic force signal. At operation 212, the SBS ECU 76 retrieves an expected pump output pressure corresponding to the predetermined braking pressure from the look-up table 80. At operation 214, the SBS ECU 76 compares the expected pump output pressure to the estimated pump output pressure to determine whether the estimated pump output pressure exceeds the expected pump output pressure by a predetermined range. At operation 216, the SBS ECU 76 indicates that a test passed when the estimated pump output pressure is within the predetermined range at operation 216 and indicates the test failed when the estimated output pressure is output the predetermined range at operation 218. At operation 220, the SBS ECU 76 generates a control signal that modifies an operational state of a vehicle. For example, the SBS ECU 76 may generate a signal that prevents operation of the vehicle until the SBS 14 is serviced. At operation 222, the SBS ECU 76 generates a "Test Complete" message.

The PBS ECU 36 may also optionally be provided with a memory that has the stored look-up table needed to evaluate the estimated and expected pump output pressures obtained during the SBS validation test.

In some implementations, the calipers 60, 64 are tested sequentially. For example, the motor 74 actuates the pump 70 to build the pressure in the caliper 64, the counter electromagnetic force is measured, and the SBS ECU 76 determines whether SBS 14 is operating properly. The motor 74 then actuates the pump 66 to build the pressure in the caliper 60, the counter electromagnetic force is measured, and the SBS ECU 76 determines whether SBS 14 is operating properly. In other implementations, the calipers 60, 64 are tested during the same time interval. For example, both pumps 66, 72 are actuated at the same time.

The system 10 and method of the present disclosure describe means to validate the operation of the SBS 14 without the need for numerous additional components to be included in the SBS 14, such as pressure sensors, or the like.

The system 10 and method of the present disclosure also provides the significant advantage of being easily retrofitted into existing vehicles that include an SBS which is controlled by an electronic stability control system. In most implementations, this retrofitting may be accomplished without the need to make any hardware modifications to the SBS 14.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for validating operation of a secondary braking system (SBS) of a vehicle having a plurality of brakes, the method comprising:
   generating a predetermined braking pressure for at least one brake of the plurality of brakes;
   calculating, via an electronic control unit (ECU), an estimate of a pump output pressure based upon a counter electromagnetic force generated by a motor within the SBS;
   comparing an expected pump output pressure to the estimate, wherein the expected pump output pressure corresponds to the predetermined braking pressure; and
   determining whether the SBS is operating properly based upon the comparison.

2. The method of claim 1, wherein comparing the expected pump output pressure to the estimate further comprises calculating a difference between the expected pump output pressure and the estimate.

3. The method of claim 2, wherein determining whether the SBS is operating properly further comprises determining the SBS is not operating properly when the difference exceeds a predetermined threshold.

4. The method of claim 1, further comprising retrieving the expected pump output pressure from a look-up table based upon the predetermined braking pressure.

5. The method of claim 1, wherein generating the predetermined braking pressure further comprises generating the predetermined braking pressure by actuating a first pump associated with a first brake of the plurality of brakes to build a pressure associated with the first brake to the predetermined braking pressure.

6. The method of claim 1, wherein the ECU comprises an ECU of the SBS.

7. The method of claim 1, further comprising:
   determining whether a timer exceeds a predetermined time; and
   measuring the counter electromagnetic force when the timer exceeds the predetermined time.

8. The method of claim 7, wherein generating the predetermined braking pressure for the at least one brake of the plurality of brakes further comprises generating the predetermined braking pressure for the at least one brake of the plurality of brakes and initializing the timer.

9. A method for validating operation of a secondary braking system (SBS) of a vehicle having a plurality of brakes, the method comprising:
generating a predetermined braking pressure for at least one brake of the plurality of brakes;
calculating, via an electronic control unit (ECU) of the SBS, an estimate of a pump output pressure based upon a counter electromagnetic force generated by a motor within the SBS;
retrieving an expected pump output pressure corresponding to the predetermined braking pressure;
comparing the expected pump output pressure to the estimate, wherein the expected pump output pressure corresponds to the predetermined braking pressure; and
determining whether the SBS is operating properly based upon the comparison.

10. The method of claim 9, wherein comparing the expected pump output pressure to the estimate further comprises calculating a difference between the expected pump output pressure and the estimate.

11. The method of claim 10, wherein determining whether the SBS is operating properly further comprises determining the SBS is not operating properly when the difference exceeds a predetermined threshold.

12. The method of claim 9, further comprising retrieving the expected pump output pressure from a look-up table based upon the predetermined braking pressure.

13. The method of claim 9, wherein generating the predetermined braking pressure further comprises generating the predetermined braking pressure by actuating a first pump associated with a first brake of the plurality of brakes to build a pressure associated with the first brake to the predetermined braking pressure.

14. The method of claim 9, further comprising:
determining whether a timer exceeds a predetermine time; and
measuring the counter electromagnetic force when the timer exceeds the predetermined time.

15. The method of claim 14, wherein generating the predetermined braking pressure for the at least one brake of the plurality of brakes further comprises generating the predetermined braking pressure for the at least one brake of the plurality of brakes and initializing the timer.

16. A system for validating operation of a secondary braking system (SBS) of a vehicle having a plurality of brakes, the system comprising:
a primary braking system (PBS);
the SBS configured to be controlled to generate a predetermined braking pressure in the SBS for at least one of the brakes; and
an electronic subsystem configured to:
calculate an estimate of a pump output pressure based upon a counter electromagnetic force generated by a motor within the SBS;
compare an expected pump output pressure to the estimate, wherein the expected pump output pressure corresponds to the predetermined braking pressure; and
determine whether the SBS is operating properly based upon the comparison.

17. The system of claim 16, wherein the electronic subsystem is further configured to calculate a difference between the expected pump output pressure and the estimate and determine the SBS is not operating properly when the difference exceeds a predetermined threshold.

18. The system of claim 16, wherein the electronic subsystem is further configured to generate a signal when the comparison indicates that the SBS is not operating properly.

19. The system of claim 16, wherein the electronic subsystem is further configured to retrieve the expected pump output pressure from a look-up table based upon the predetermined braking pressure.

20. The system of claim 16, wherein the electronic subsystem comprises an electronic subsystem of the SBS.

* * * * *